Oct. 13, 1959 G. R. KIEWITT 2,908,236
ROOF STRUCTURE
Filed Dec. 8, 1955 3 Sheets-Sheet 1

Gustel R. Kiewitt,
Inventor.
Koenig and Pope,
Attorneys.

Oct. 13, 1959

G. R. KIEWITT 2,908,236

ROOF STRUCTURE

Filed Dec. 8, 1955

Gustel R. Kiewitt,
Inventor.
Koenig and Pope,
Attorneys.

Oct. 13, 1959     G. R. KIEWITT     2,908,236
ROOF STRUCTURE

Filed Dec. 8, 1955     3 Sheets-Sheet 3

Gustel R. Kiewitt,
Inventor.
Koenig and Pope,
Attorneys.

United States Patent Office 2,908,236
Patented Oct. 13, 1959

2,908,236

ROOF STRUCTURE

Gustel R. Kiewitt, Ladue, Mo.

Application December 8, 1955, Serial No. 551,766

1 Claim. (Cl. 108—1)

This invention relates to roof structures, more particularly to roof structures of dome shape.

Among the several objects of the invention may be noted the provision of a roof framework having the shape of a dome which may be constructed more economically than prior dome-type frameworks of comparable capacity; the provision of a roof framework of the class described which is of such construction that the dead load is substantially uniformly distributed in the framework throughout the surface area of the dome, and also such as to enable simplification of stress analysis; the provision of a roof framework of this class which is of such construction as to enable the substantial use of approximately duplicate members (i.e., members having the same cross-section and approximately the same length), thereby simplifying the fabrication of the framework; the provision of a roof framework of this class which is of such construction that each member of the framework is subject only to direct loads, and not subject to any moments except for those which may occur because of local loadings and secondary actions; and the provision of a framework of the class described which may be readily fabricated of conventional commercially available structural members and readily erected in the field. Other objects and features will be in part apparent and in part pointed out hereinafter.

The invention accordingly comprises the construction hereinafter described, the scope of the invention being indicated in the following claim.

In the accompanying drawings, in which several of various possible embodiments of the invention are illustrated, Fig. 1 is a diagrammatic plan view of a roof framework of this invention;

Corresponding reference characters indicate corresponding parts throughout the drawings.

Figure 1:
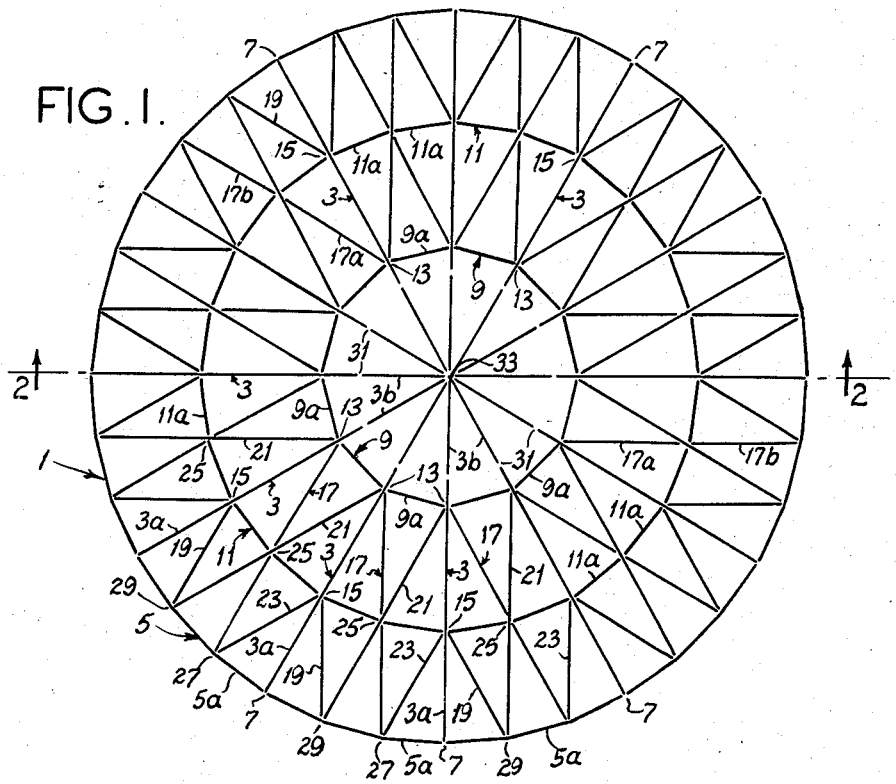
Figure 2:
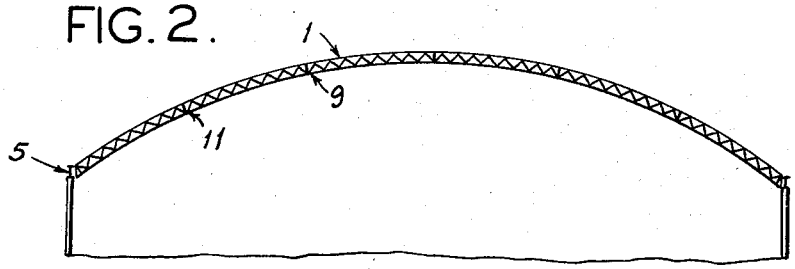
Fig. 2 is a central vertical section taken on line 2—2 of Fig. 1.

Referring to Figs. 1 and 2 of the drawings, a framework of this invention is generally designated 1. The framework has the shape of a dome and is of isometrical pattern with respect to the vertical axis of the dome. The term dome as used herein means a roof structure shaped according to a curved surface of revolution, as for example it may be a part-spherical or curved dome, a part-elliptical curved dome, or the like. The framework is shown to comprise a plurality of projectively intersecting meridian members 3 located on meridians of the dome and dividing the dome into a plurality of equal angled sectors, that is, the meridian members form approximately equiangular curved segments around the center of the dome. It further comprises an outer circumferential member or ring 5 located on a parallel of the dome concentric with the vertical axis of the dome and defining the lower edge of the dome. The meridian members are connected to the outer circumferential member or ring at outer joints indicated at 7.

The framework further comprises a plurality of inner circumferential members or rings located on parallels of the dome concentric with the vertical axis of the dome, and connected to the meridian members at inner joints. As shown in Fig. 1, which illustrates a relatively small framework, there are two such inner circumferential members or rings, the innermost of these being designated 9 and the circumferential member or ring which lies between the ring 9 and the ring 5 being designated 11. Ring 11 is located centrally between the outer ring 5 and the inner ring 9. The joints at which the inner circumferential member or ring 9 and the meridians 3 are connected are designated 13. The joints at which the intermediate circumferential member or ring 11 and the meridians 3 are connected are designated 15. As the drawings show, the rings 5, 11 and 9 are substantially equally spaced from 33 along the lengths of the meridian members 3.

Figure 4:
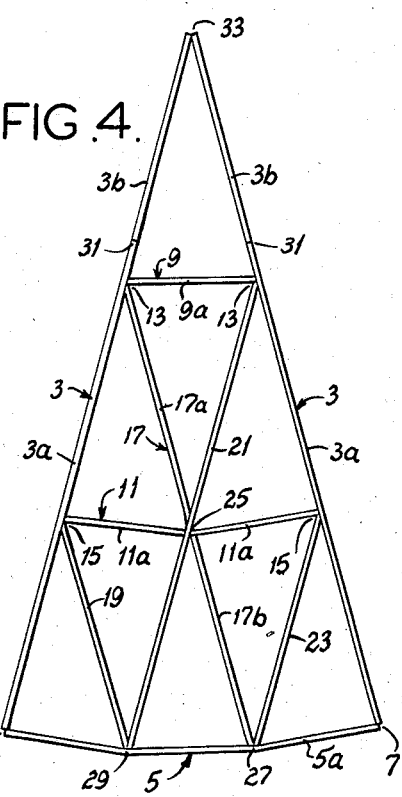
Fig. 4 is an enlargement of one sector of the framework.
Figure 6:
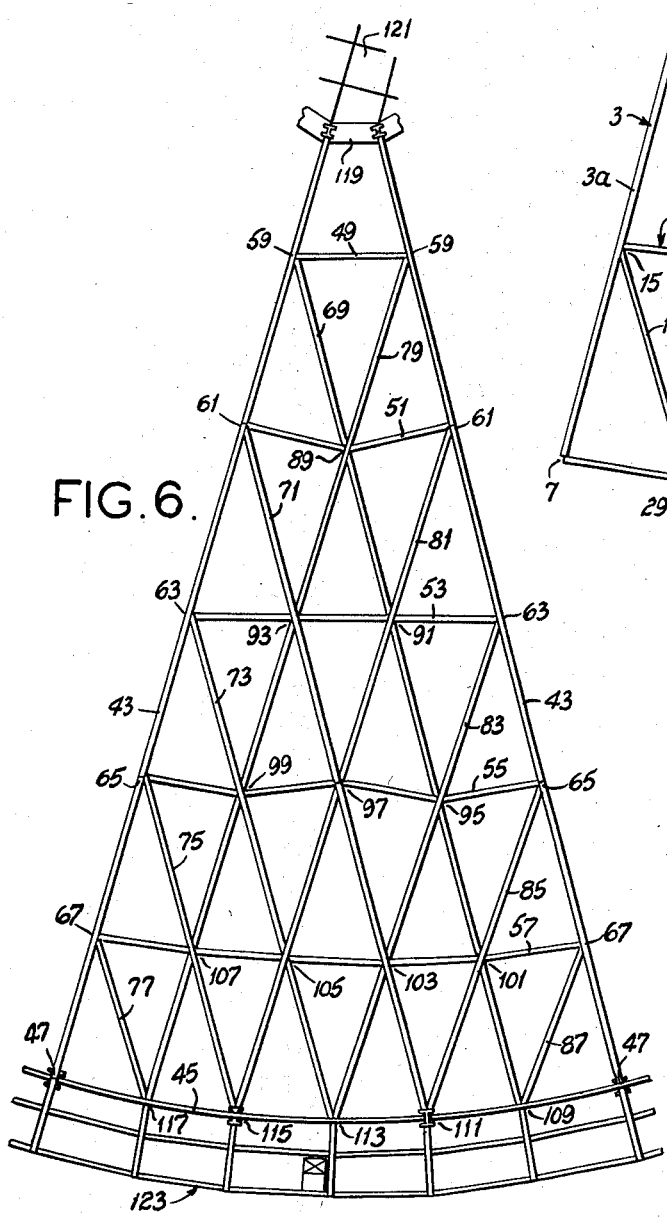

Each sector is triangulated by rib members which triangulate between apex 33 and ring 9, between rings 9 and 11, and between rings 11 and 5. These ribs are located on lines indicated at 17 and 19 extending from the inner joints 13 and 15 at one side of the sector (its left side as illustrated in Fig. 4) to the outer ring 5 approximately parallel to the other (right) side of the sector, and on lines indicated at 21 and 23 extending from the inner joints 13 and 15 at the other (right) side of the sector to the outer ring 5 approximately parallel to the one side (the left side) of the sector. The lines 17 and 21 intersect one another and intersect the intermediate ring 11 midway between the two meridian members 3 of the sector, the point of intersection being designated 25. The lines 17 and 21 intersect the outer ring 5 at the one-third points of the portion of member 5 between the two meridian members 3 of the sector, the points of intersection being respectively designated 27 and 29. The line 19 intersects the outer ring 5 and line 21 at point 29. The line 23 intersects the outer ring 5 and line 17 at point 27. Thus three chord members are established between each pair of points 7 in the outer ring 5; two chords between each pair of points 15 in the ring 11; and one chord between each pair of points 13 in ring 9. The general rule, as will also be apparent from the Fig. 5 form of the invention, to be described, is that the number of chord members in the outermost ring between each pair of meridians corresponds to the number of rings, and the number of chord members of each succeeding inner ring, between each pair of meridians, decreases by one. The stated arrangement of triangulating ribs results in two triangulating ribs within a pair of adjacent meridians and the first pair of rings 9 and 11, four triangulating ribs between the same pair of meridians and the second pair of rings 11 and 5, etc. The general rule in this regard is that the number of ribs between successive pairs of rings corresponds to the even numbers, starting with two ribs between the innermost pair of rings. This triangulates the spaces between adjacent rings according to the odd numbers, starting with three between the innermost pair of rings. Extrapolation in regard to the use of more than three rings, as shown in Fig. 1, will appear below where Fig. 6 is described.

Figure 3:
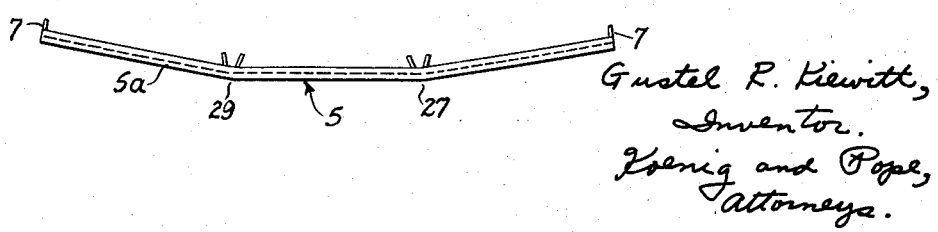
Fig. 3 is a detail of a supporting member of the Fig. 1 framework.

The framework may be fabricated of any suitable conventional structural sections. For example, each member of the framework may be a lattice girder. As shown, the outer ring 5 may consist of a series of individual supporting beam members 5a each having a length corresponding to the length of the outer arc of one of the sectors, with these beams 5a connected together at their ends and connected to the outer ends of the meridian members 3 at the outer ring joints 7. One of the beams 5a is illustrated in plan in Fig. 3 and is shown to be bent at its one-third points (the points 27 and 29) to approximate an arc having its center in the vertical axis of the dome. Each of the meridian members 3 is shown as comprising a section 3a extending from the respective joint 7 to a point 31 located inward of the inner ring 9, and a section 3b connected to the inner end of 3a by a joint at 31 and continuing to the apex center 33 of the dome. Sections 3b are joined together at 33.

The inner ring 9 is shown as consisting of individual chords 9a, each having a length corresponding to the length of the chord subtended by the two meridians of a sector at the radius of the inner ring. These chords 9a are connected at their ends to the respective meridian members 3 at the inner ring joints 13. The intermediate ring 11 is shown as consisting of individual chords 11a, each having a length corresponding to the length of a chord subtended by the median of a sector and an adjoining meridian at the radius of the intermediate ring. Thus, there are two chords 11a in each sector. One of these extends from the inner ring joint 15 at one side of the sector to a joint at the point 25, and the other extends from the inner ring joint 15 at the other side of the sector to the joint at the point 25. On line 17 there are two members 17a and 17b, 17a extending from joint 13 to the joint at 25, and 17b extending from the joint at 25 to a joint at 27. On line 21 there is one member (also designated 21) extending continuously from joint 13 to a joint at 29. On lines 19 and 23 there are single members also designated 19 and 23, member 19 extending from the joint 15 at the left side of the sector to the joint at 29, member 23 extending from the joint 15 at the right side of a sector to the joint at 27. The joints at 7, 13, 15, 25, 27 and 29 may be of any suitable conventional construction for transmitting forces. For example, they may be welded joints.

The above-described construction is of such character that each individual member of the framework is subjected substantially only to direct loads, except for moments due to secondary actions and local loadings, the arrangement of the frame members permitting the full and continuous development of both meridian and circumferential forces. In the case of a so-called flat dome, which is a dome in which the angle between the vertical axis of the dome and a line drawn from the spherical center of the dome to the outer edge of the dome is less than 51° 49', the outer ring 5 is in tension, and every other member is in compression. The framework may be safely designed with members of comparatively small cross section, thereby to effect substantial savings in the total weight of material used in the framework. Since the meridians 3 divide the framework into equal sectors and since the sectors are all identical, stress analysis and fabrication are simplified. The force distribution is such that all the members of the framework except for those constituting the rings may have the same cross section and be made of the same stock, thereby simplifying design and fabrication. Thus, as shown in Fig. 2, the depths of all of the meridian members 3 and rib members 17, 19, 21, 23 are the same. With the triangulation members approximately parallel to the meridian members as above described, it is possible to make many of the frame members of approximately equal length.

Figure 5:
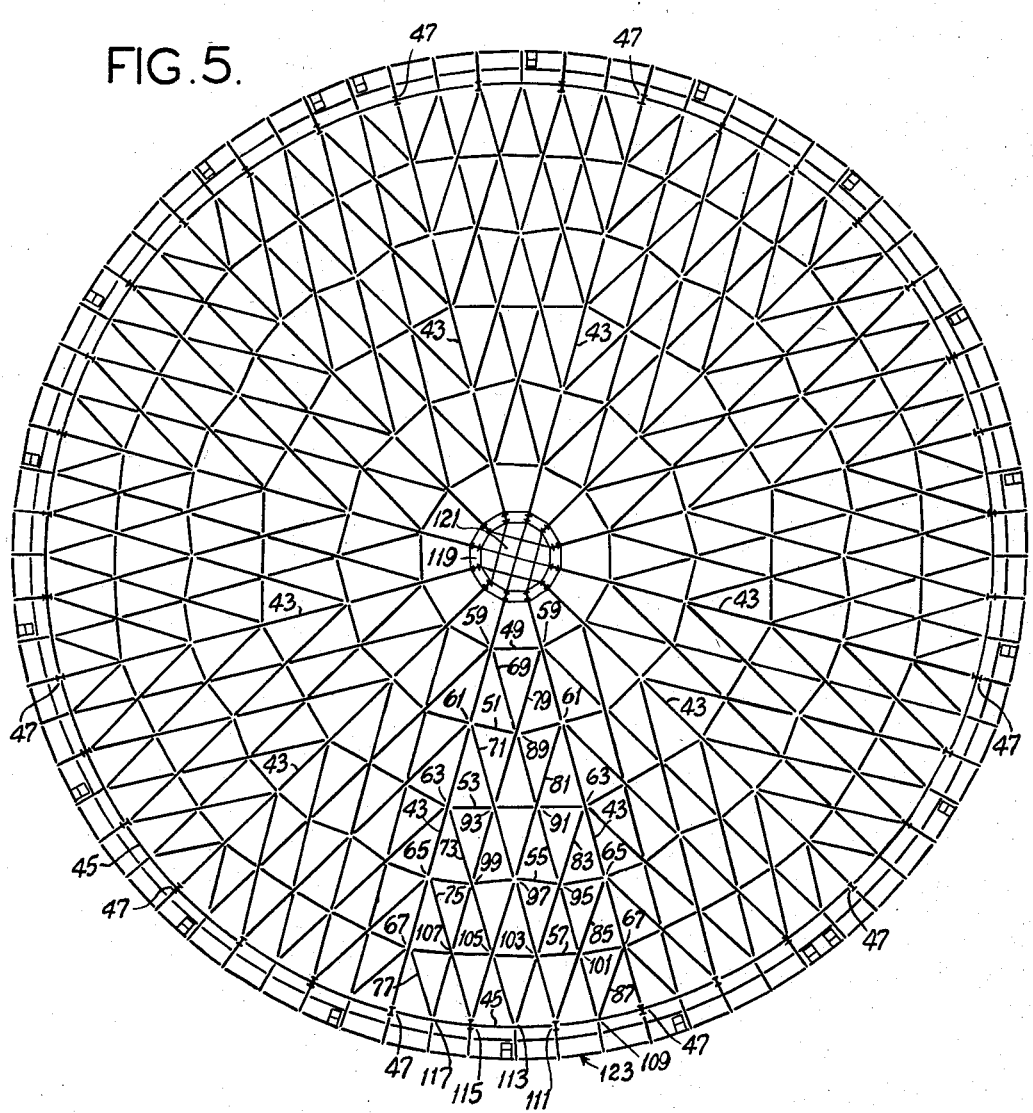
Fig. 5 is a view similar to Fig. 1 showing the principles of the invention as applied to a larger dome; and, Fig. 6 is an enlargement of one sector of the Fig. 5 dome.

Figs. 5 and 6 illustrate a larger dome than that illustrated in Fig. 1 constructed in accordance with this invention. As shown, the dome has a plurality of meridian members 43 corresponding to the members 3 of Fig. 1. It has an outer ring 45 corresponding to the ring 5, to which the meridian members are connected at outer ring joints indicated at 47. It is further shown to comprise an inner ring 49 corresponding to the ring 9, but, instead of having only one intermediate ring, it has four intermediate rings designated 51, 53, 55 and 57. The inner ring joints at which rings 49, 51, 53, 55 and 57 are connected to the meridian members 43 are respectively designated 59, 61, 63, 65 and 67.

Each of the sectors into which the Fig. 5 dome is divided by meridian members 43 is triangulated by members located on lines indicated at 69, 71, 73, 75 and 77 extending from the joints 59, 61, 63, 65 and 67 at one side of the sector (its left side as illustrated in Fig. 6) to the outer ring 45 approximately parallel to the other (right) side of the sector, and by members located on lines indicated at 79, 81, 83, 85 and 87 extending from the joints 59, 61, 63, 65 and 67 at the other (right) side of the sector to the outer ring 45 approximately parallel to the one side (the left side) of the sector.

The lines 69 and 79 and the ring 51 intersect at 89.
The lines 69 and 81 and the ring 53 intersect at 91.
The lines 71 and 79 and the ring 53 intersect at 93.
The lines 69 and 83 and the ring 55 intersect at 95.
The lines 71 and 81 and the ring 55 intersect at 97.
The lines 73 and 79 and the ring 55 intersect at 99.
The lines 69 and 85 and the ring 57 intersect at 101.
The lines 71 and 83 and the ring 57 intersect at 103.
The lines 73 and 81 and the ring 57 intersect at 105.
The lines 75 and 79 and the ring 57 intersect at 107.
The lines 69 and 87 and the outer ring 45 intersect at 109.
The lines 71 and 85 and the outer ring 45 intersect at 111.
The lines 73 and 83 and the outer ring 45 intersect at 113.
The lines 75 and 81 and the outer ring 45 intersect at 115.
The lines 77 and 79 and the outer ring 45 intersect at 117.
At each of the stated intersections of the lines and the rings, the members in the lines and the rings are connected together for transfer of forces by suitable joints. The length of the members used in constructing the dome may be ascertained from Fig. 5, the gaps in the lines indicating the ends of the respective members. Figs. 5 and 6 also show the meridian members 43 having their inner ends connected to a supporting ring 119 for a lantern such as indicated at 121. Figs. 5 and 6 also illustrate a cantilever extension 123 from the outer ring of the dome.

The framework illustrated in Figs. 5 and 6 has the same characteristics as that of Figs. 1 to 4, the principal difference being that additional rings and triangulation members are required in view of its greater size. Fig. 5 also illustrates the intermediate rings as being somewhat irregular due to designing the framework as much as possible with triangulation members of equal length, but it will be understood that this is not necessary, and may be dispensed with for aesthetic reasons.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

A curved dome comprising a plurality of centrally convergent curved meridian members of approximately equal lengths and constant depths throughout their said lengths, said meridian members forming approximately equiangular curved segments around the center of the dome, a plurality of approximately parallel main rings concentric with the dome axis and secured to said meridian members, said rings being spaced at approximately equal distances along the lengths of said meridian members and comprising a plurality of connected chord members of approximately equal lengths, the number of chord members in the outermost ring between each pair of meridian members corresponding in number to the number of rings, the chord members of each succeeding inner ring between each pair of meridian members decreasing in number by one, at least one pair of outwardly converging curved triangle-forming rib members extending from each ring, said rib members being of approximately equal lengths and constant depths throughout their said lengths, which depths substantially equal the said depths of the meridian members, the rib members of each pair converging to an apex on the next larger ring, the apexes being located between said equal chord lengths and forming a number of triangles in the spaces between adjacent meridian members and adjacent rings, the number of triangle-forming rib members between adjacent rings and meridian members progressively differing by two, the innermost pair of rings having two such triangle-forming rib members, the number of triangles formed in said spaces by said triangle-forming rib members between successively adjacent larger rings corresponding to the odd numbers starting with three between said inner pair of rings.

References Cited in the file of this patent

UNITED STATES PATENTS

| | | |
|---|---|---|
| 2,167,048 | Legarda | July 25, 1939 |
| 2,773,458 | Foster | Dec. 11, 1956 |

FOREIGN PATENTS

| | | |
|---|---|---|
| 10,561 | Great Britain | May 5, 1913 |
| 140,073 | Great Britain | May 8, 1920 |
| 456,323 | Germany | Aug. 27, 1928 |
| 590,294 | Great Britain | July 14, 1947 |
| 1,036,928 | France | Apr. 29, 1953 |

OTHER REFERENCES

Engineering News, July 29, 1915, volume 74, No. 5, page 208.